Jan. 30, 1962  W. L. HEYNIGER  3,018,867
INFLATABLE ESCAPE CHUTE
Original Filed Sept. 30, 1957
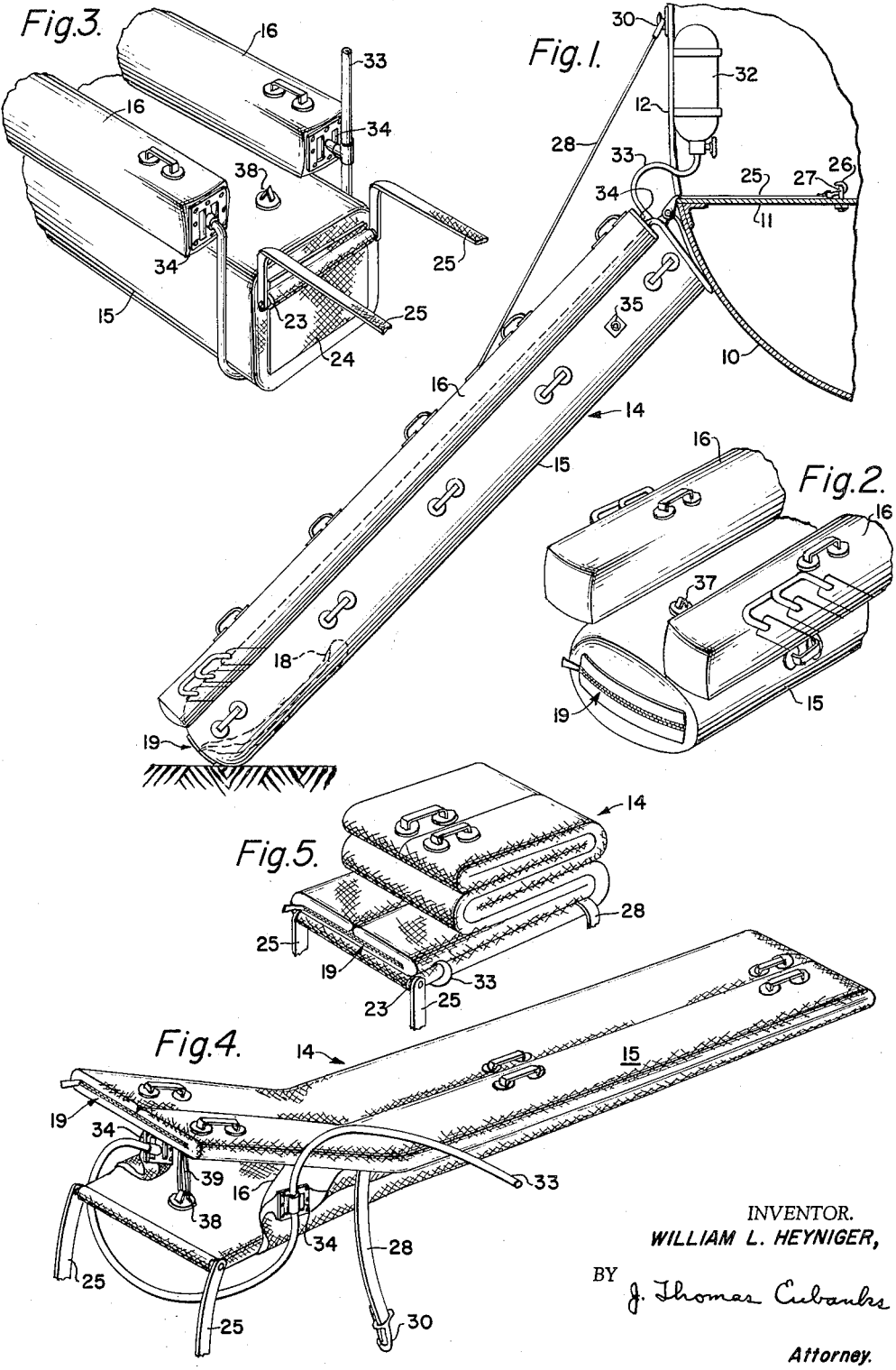
INVENTOR.
WILLIAM L. HEYNIGER,
BY J. Thomas Eubanks
Attorney.

United States Patent Office 3,018,867
Patented Jan. 30, 1962

3,018,867
INFLATABLE ESCAPE CHUTE
William L. Heyniger, Levittown Township, Burlington County, N.J., assignor to The Garrett Corporation, Los Angeles, Calif., a corporation of California
Original application Sept. 30, 1957, Ser. No. 686,951, now Patent No. 2,936,056, dated May 10, 1960. Divided and this application Mar. 3, 1960, Ser. No. 12,617
7 Claims. (Cl. 193—25)

This invention relates to an inflatable escape chute for facilitating the safe escape of persons or removal of cargo from an aircraft making a forced landing where no rigid stair, ramp or gangplank is available.

This application is a division of my copending application Serial No. 686,951 for Variable Length Inflatable Escape Chute, filed September 30, 1957, now Patent No. 2,936,056 issued May 10, 1960.

When an aircraft makes a forced landing, there is always great danger that the gas or fuel may ignite and/or explode. It is therefore desirable that means be provided to evacuate the passengers and crew in the shortest possible time. Since usually the door of the aircraft is high above the ground and no rigid stairway or ramp is available in such cases, some quick emergency escape means, such as an escape chute or slide, must be provided.

One such escape means that has heretofore been proposed for use in case of a forced landing is the inflatable escape chute shown in the Boyle U.S. Patent, No. 2,765,131. This chute is adapted to be launched and manned from the aircraft and can be inflated within a very short time to form a rigid slide or ramp from the door of the aircraft to the earth's surface.

In case of a forced landing, one end of the inflatable escape chute shown in the aforementioned Boyle patent is secured to the aircraft and the other end is dropped from the aircraft. When the chute unfolds and hangs downwardly from the plane, the lower end of the chute ends to rest on the earth's surface directly beneath the door of the aircraft. However, if there is a prevailing wind, the force of the wind may carry the lower end of the chute beneath the plane. If air is injected into the chute while the lower end of the chute is in this position the lower end of the chute will be retained beneath the plane and the chute will be rendered useless for its intended purpose.

It is an object of the present invention to provide an inflatable escape chute having means to minimize the chances of the lower end of the chute being carried under and retained beneath the airplane.

According to the principal feature of the invention, when the chute is folded for insertion in a container the chute is first folded back on itself at approximately the center of the chute and the upper and lower ends of the chute are secured together by a releasable means. Thus the chute will hang less than its full extension when it is dropped from the airplane and the fold will be retained above the earth's surface. The releasable means holding the ends of the chute together are adapted to be broken or disengaged by the distending forces when the chute is partially inflated. When the releasable means are broken or disengaged, the lower portion of the chute will swing about the mid-fold and the bottom end of the chute will contact the earth's surface outwardly of the plane and form a slide for a person escaping from the plane.

It is a further object of the invention to provide an escape chute of the aforementioned type that is adapted to be compactly stowed and carried in the aircraft.

Other and further objects of the present invention will become apparent from the disclosures in the following detailed specification, appended claims, and accompanying drawings, wherein:

FIG. 1 is an elevational view of an inflatable escape chute;

FIG. 2 is an enlarged perspective view of the ground end of the inflatable escape chute;

FIG. 3 is an enlarged perspective view of the upper end of the inflated escape chute;

FIG. 4 is a perspective view of the inflatable escape chute with the chute shown deflated and partially folded for storage in a container; and FIG. 5 is a perspective view of the inflatable escape chute with the chute shown deflated and completely folded for insertion in a container.

Referring to FIG. 1 of the drawings, there is shown an airplane, or other aircraft, having a body 10, a floor 11, and a door opening 12.

A variable length inflatable escape chute 14 of the type shown and described in my copending application Serial No. 686,951 is shown attached to the aircraft by means hereinafter described in detail. The chute 14 comprises an elongated, flexible-walled, inflatable fabric middle member 15 and a pair of elongated, flexible-walled, inflatable fabric rail members 16. The rail members 16 are longitudinally secured to the middle member 15 and communicate with its interior through intercommunicating holes, not shown. The members 15 and 16 form a trough shaped structure wherein the surface of the middle member between the rail members presents a slide-way surface. However, if a slide surface having better sliding characteristics than the fabric of the middle member is desired, a material having such characteristics may be placed on, or be bonded to, the upper surface of the middle member between the rail members.

At the upper end of the escape chute, the end of the middle member 15 and the ends of the rail members 16 are closed by fixedly located integral end walls. The rail members 16 are also closed at their lower ends by fixedly located end walls. The middle member 15 is provided at the ground end with a portion 18 which may be extended or may be turned back inside the middle member and held therein by a quick release or clamping mechanism 19, as described in detail in my copending application Serial No. 686,951.

At the upper end of the chute an attachment bar 23 is retained in place by a fabric sheet 24 secured to the end wall of the middle member 15, as shown in FIG. 3. A pair of ties 25 attached at opposite ends of the bar 23 are provided with snap hooks 26 at their upper ends for engaging eye bolts 27 or other quick attachable means secured to a portion of the plane, such as the floor. A pair of bracing lines, such as the lines 28 shown in FIG. 1, are secured at their lower ends to the respective rail members where the chute's load is initially applied. At their upper ends, the lines 28 are provided with a hook 30 or other means for engagement with a suitable fastener located on the respective sides of the door opening 12.

A compressed air cylinder 32 which may be secured by brackets to the wall 10 of the aircraft at one side of the door opening 12, is connected by a flexible air hose 33 to aspirator type jet pumps 34 which are mounted on the upper end wall of the rail members 16 and are adapted to eject a jet of air from the cylinder 32, and atmospheric air entrained by the jet into the members 16 to inflate them. Air then passes from the members 16 through the interconnecting holes into the middle members 15.

Sufficient air and/or gas must be provided to inflate the chute to full volume but excess gas and/or air pressure must be relieved. A relief valve 35 is therefore provided at any convenient location on the chute to dump the excess gas and to prevent bursting of the structure.

When the escape chute is folded for insertion in a preselected container, the rail members 16 are first folded inwardly toward the center and each side of the slide is then folded outwardly under the main portion of the slide so that overall width is slightly less than that of the container. The chute is then folded back on itself as shown in FIG. 4 so that a tie patch 37 located adjacent the ground end of the member 15 and a tie patch 38 located adjacent the upper end of the member 15 lie one above the other. The tie patches are then secured together by a breakable cord 39. Starting from the bottom end, the chute is then folded and flaked into a package having a substantially rectangular shape so that the last folded end is just short of the jet pump 34 and the clamping mechanism 19 is readily accessible, as shown in FIG. 5. The chute is then placed in the container, (not shown) with the ties and the flexible hose extending out of the corners of the container.

While the chute is described and shown as being folded into a substantially rectangular shape capable of being inserted into a container, it is to be understood that the chute, after being folded as shown in FIG. 4, may be rolled, beginning at the mid-fold and rolling toward the ends, into a cylindrical form equally capable of being inserted into a container.

In operation, the flexible air hose 33 is connected with the air cylinder 32, and the snap hooks 26 on the ties 25 are engaged with the eye bolts 27 or other attachable means. Since the flexible hose and the ties extend out of the container, the above connection and attachments may be made before the airplane takes off and while the chute is still in the container. Thus, in case of a forced landing, the door of the aircraft is opened, the line 28 is secured by the hooks 30 to the fastener or other engagement means at the door of the aircraft, and the chute is removed from the container and dropped from the aircraft. The chute will unfold or unroll and hang from the plane with the upper and lower ends secured together by the breakable cord 39 as shown in FIG. 4. By hanging less than the full extension, the chances of the lower end of the chute contacting the earth's surface or being carried beneath the airplane by prevailing winds is minimized. As the air in the cylinder 32 is released and the chute is inflated, the cord 39 is broken by the distending forces. When the releasable means are broken or disengaged, the lower portion of the chute swings about the fold and the bottom end of the chute contacts the earth's surface outwardly of the plane.

Although the present invention has been described as utilized with an escape chute of the type shown in my copending application Serial No. 686,951, it is obvious that the invention is susceptible of being used on many other types of escape chutes and slides.

Furthermore, the above described chute is susceptible of being utilized on buildings or other structures, as well as on aircraft, to facilitate the escape of persons or the removal of cargo therefrom.

I claim:

1. A slide for a structure, comprising: an inflatable member presenting a slide-way surface and having sufficient strength when inflated to support the weight of a load carried on said slide-way surface; means for supporting one end of the slide at the structure; and breakable means for retaining one end of the inflatable member contiguous the other end of the member, said breakable means being adapted to be broken by the distending forces when the member is inflated.

2. A slide for a structure, comprising: inflatable means supporting a slide-way surface and having sufficient strength when inflated to support the weight of a load carried on said slide-way surface; means for supporting one end of the slide at the structure; and releasable means for retaining one end of the inflatable means contiguous the other end of the inflatable means, said releasable means being adapted to be released by the distending forces when the inflatable means is inflated.

3. A slide for a structure, comprising: inflatable beam means supporting a slideway surface, the inflatable beam means having sufficient strength when inflated to support the weight of a load carried on said slide-way surface; means for supporting one end of the slide at the structure; and releasable means for retaining one end of the slide contiguous the other end of the slide, said releasable means being adapted to be released by the distending forces upon inflation of the beam means.

4. A slide for a structure, comprising: a plurality of inflatable beams supporting a slide-way surface, the inflatable beams having sufficient strength when inflated to support the weight of a load carried on said slide-way surface; means for supporting one end of the slide at the structure; and releasable tie means for securing one end of the slide to the other end of the slide, said tie means being adapted to be released by the distending forces when the beams are inflated.

5. A slide for a structure, comprising: a plurality of inflatable beams supporting a slide-way surface, the inflatable beams having sufficient strength when inflated to support the weight of a load carried on said slide-way surface; means for supporting one end of the slide at the structure; a first tie patch secured on one side of said slide adjacent one end thereof; a second tie patch secured on the said one side of the slide adjacent the other end thereof; and releasable means for securing said first tie patch to said second tie patch, said releasable means being adapted to be released by the distending forces when the beams are inflated.

6. A slide for a structure, comprising: a plurality of interconnected and communicating elongated, flexible-walled, inflatable members including a pair of rail members and a middle member forming a trough shaped chute having a slide-way surface on said middle member, said chute having sufficient strength when inflated to support the weight of a load carried on said slide-way surface; means for supporting one end of the slide at the structure; a first tie patch secured on said slide-way surface adjacent one end of the slide; a second tie patch secured on said slide-way surface adjacent the other end of the slide; and releasable means for securing said first tie patch to said second tie patch, said releasable means being adapted to be released by the distending forces when the inflatable members are inflated.

7. A slide for a structure, comprising: a plurality of inflatable means supporting a slide-way surface, the inflatable beams and the slide-way surface being adapted to be folded or rolled for insertion into a container, the inflatable beams having sufficient strength when inflated to support the weight of a load carried on said slide-way surface; means for supporting one end of the slide at the structure, said supporting means being disposed to extend outwardly from the folded or rolled slide for attachment to the structure before the beams are inflated; and releasable means for securing one end of the slide to the other end of the slide, said releasable means being adapted to be released by the distending forces when the beams are inflated.

References Cited in the file of this patent

UNITED STATES PATENTS

| | | |
|---|---|---|
| 2,095,974 | Finch | Oct. 17, 1937 |
| 2,623,574 | Damsch | Dec. 30, 1952 |
| 2,752,977 | Clarke | July 3, 1956 |
| 2,765,131 | Boyle | Oct. 2, 1956 |

UNITED STATES PATENT OFFICE
CERTIFICATE OF CORRECTION

Patent No. 3,018,867                      January 30, 1962

William L. Heyniger

It is hereby certified that error appears in the above numbered patent requiring correction and that the said Letters Patent should read as corrected below.

Column 1, line 38, for "ends" read -- tends --; column 4, line 53, for "means" read -- beams --.

Signed and sealed this 24th day of July 1962.

(SEAL)
Attest:

ERNEST W. SWIDER
Attesting Officer

DAVID L. LADD
Commissioner of Patents